Feb. 19, 1957     C. H. PESCHKE     2,781,988
WINDING MACHINE FOR LINK SAUSAGE
Filed March 19, 1954     2 Sheets-Sheet 1
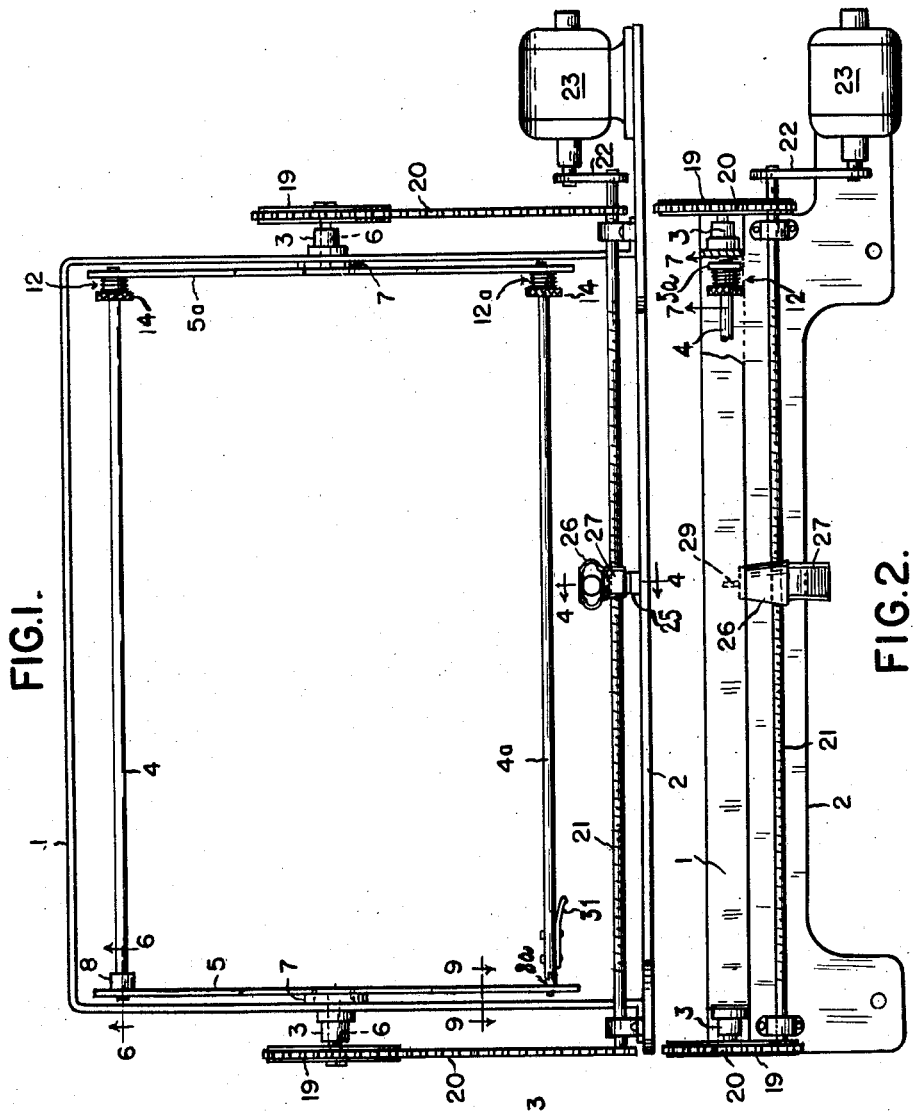
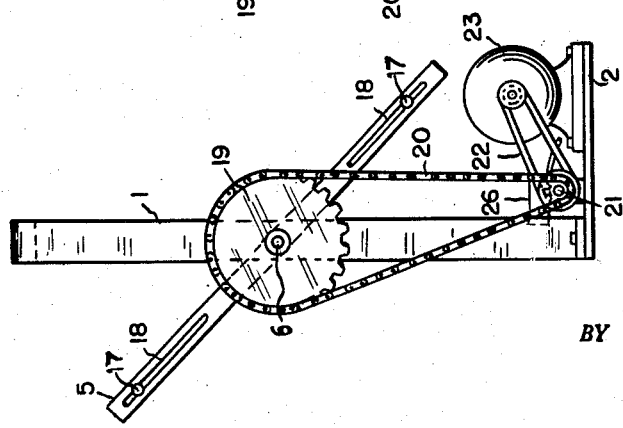
INVENTOR.
CARL H. PESCHKE
BY
*J. S. Murray*
ATTORNEY Feb. 19, 1957 C. H. PESCHKE 2,781,988
WINDING MACHINE FOR LINK SAUSAGE
Filed March 19, 1954 2 Sheets-Sheet 2
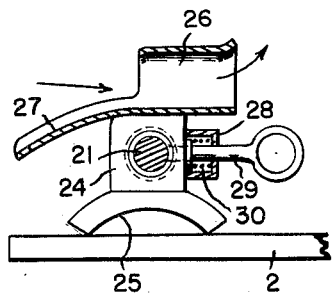
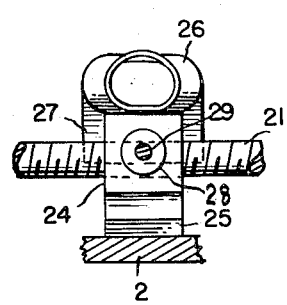
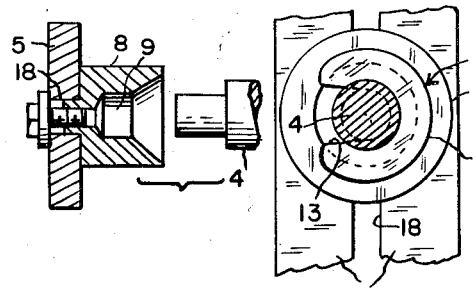
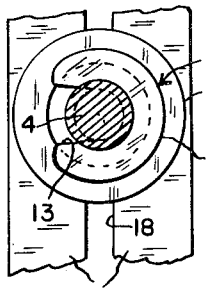
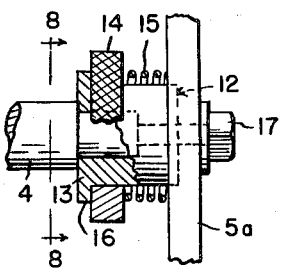
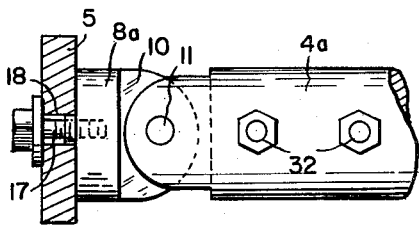
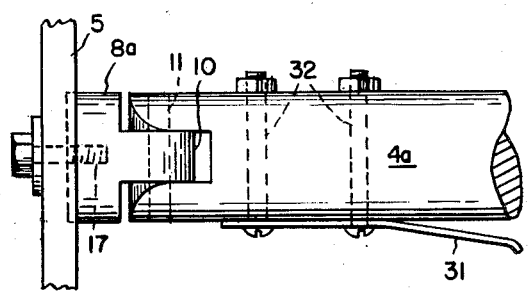
INVENTOR.
CARL H. PESCHKE
BY
J S Murray
ATTORNEY

United States Patent Office 2,781,988
Patented Feb. 19, 1957

2,781,988

WINDING MACHINE FOR LINK SAUSAGE

Carl H. Peschke, Detroit, Mich.

Application March 19, 1954, Serial No. 417,329

1 Claim. (Cl. 242—113)

This invention relates to winding machines and particularly machines for coiling strings of link sausage.

It has been the practice in sausage making to manually hang suitable lengths of link sausage on a wheeled rack for quantity delivery to a smoke room or other location. Such manual loading of the rack is slow and laborious and lacks uniformity, and commonly fails to utilize a large percentage of the rack capacity. Furthermore, in preparation of food products, it is desirable for sanitary reasons to minimize handling of such products.

An object of the invention is to provide a motor-driven machine that will rapidly and compactly wind a long string of link sausage on a suitable reel, while affording a ready transfer of the resulting sausage coil to the usual wheeled rack.

Another object is to equip a winding machine with a reel comprising a pair of parallel rods, equally and oppositely spaced from the reel axis, and a pair of supports for the rod extremities, one of the rods being pivotally mounted on one of the supports and having a latch connection to the other, whereby such rod may be swung from its normal position to facilitate removal from the reel of a sausage coil.

Another object is to adapt the other of said rods for complete removal from the reel, whereby such rod serves to transfer a sausage coil to a rack on which the coils are accumulated.

Another object is to adapt the described rods to be variously spaced from the axis of the reel so that the number of sausage links spanned between the rods may be predetermined to suit links of different standard lengths.

These and various other objects are attained by the construction hereinafter described and illustrated in the accompanying drawings, wherein:

Fig. 1 is a rear elevation view of the improved machine.

Fig. 2 is a top plan view of the machine.

Fig. 3 shows the machine in end elevation.

Fig. 4 is a detail sectional view of a guide device for delivering link sausage to the reel of the machine, the section being taken on the line 4—4 of Fig. 1.

Fig. 5 is a view of the outlet end of said guide device.

Fig. 6 is an axial sectional view of a mounting for the upper rod appearing in Fig. 1, the section being taken on the line 6—6 of Fig. 1.

Fig. 7 is a view, in axial section of a companion mounting for said upper rod, the section being taken on the line 7—7 of Fig. 2.

Fig. 8 is a sectional view of the mounting shown in Fig. 7, taken on line 8—8 of Fig. 7.

Fig. 9 is a sectional detail taken on the line 9—9 of Fig. 1, showing in top plan an end portion of and the corresponding mounting of the lower rod appearing in Fig. 1.

Fig. 10 is a side elevational view of the same.

In these views, the reference character 1 designates an arched frame formed of strap metal and rigidly surmounting an elongated base plate 2. The uprights of said frame rigidly carry a pair of horizontally aligned bearings 3. Revoluble in the frame about the axis established by said bearings is a reel comprising a pair of parallel rods 4 and 4a oppositely equidistant from said axis. Said rods are carried by and bridged between a pair of duplicate end bars 5 and 5a which rigidly and centrally carry aligned stub shafts 6 journaled in the bearings 3. Rigidly and centrally secured to the end bars are spacer blocks 7 assuring adequate clearance of the reel from the frame ends.

Rod mountings 8 and 8a are carried by the bar 5, the mounting 8 forming a socket 9 having a flaring mouth portion, as best appears in Fig. 6. The mounting 8a has a tongue 10 inserted endwise in the rod 4a and pivoted to the latter by a pin 11 parallel to the end bars (see Figs. 9 and 10). End faces of said tongue and the connected rod extremity are curved about the axis of said pin to afford swinging of the rod on the pin.

Rod mountings 12 and 12a (Figs. 7 and 8) are carried by the bar 5a and are of duplicate construction. Thus each such mounting has a channel-shaped socket 13 to receive the corresponding rod, lateral escape of the rod being normally prevented by a collar 14 slidable on the mounting. A coiled spring 15 urges the collar against a flange 16 terminally formed on the mounting whereby the collar normally serves as a lateral closure for the socket. By manually sliding the collar to its dash line position of Fig. 7 in resistance to the spring, the rod is unlatched and may be disconnected from the mounting.

Each of the mountings 8, 8a, 12 and 12a is clamped to the corresponding bar 5 or 5a by a headed bolt 17 extending through such bar, and said bars are formed, lengthwise thereof, with slots 18 accommodating such bolts. Thus the rods and their mountings may be adjusted to and from the axis of the reel so that a desired number of sausage links may extend between the two rods. The reel is thus adaptable to different lengths of sausages.

For driving the reel, sprocket wheels 19 fixed on the stub shafts 6 are engaged by chains 20 driven from the ends of a shaft 21 parallel to the reel axis. Such shaft is in turn driven through a belt 22 from a motor 23 carried by the base plate at one end of the machine. The shaft 21 has the nature of a feed screw, being engaged by a nut 24 adapted to travel lengthwise of the screw as the latter rotates. Rigidly carried by said nut is a plate 25 having its ends bent down to slidingly engage the base plate and thus prevent rotation of the nut. Rigidly surmounting the nut is a hollow funnel-shaped sheet-metal guide device 26 through which a string of sausage is fed to the reel. Said device has a curved apron portion 27 over which the sausage initially advances. The described drive connection from the shaft 21 to the reel establishes a speed ratio assuring a close relative proximity of the sausage convolutions as these are progressively formed on the reel. To permit a quick manual return of the guide device to its initial left-hand position after the reel has been filled, the nut rigidly carries a collar 28 mounting a pin 29 pressed toward the screw 21 by a coiled spring 30 and having its inner end engageable in the spiral groove of the screw thread in place of an interior thread on the nut. When the unit formed by the nut and guide has reached its right-hand limit of travel on the screw, the pin is held clear of the screw during a rapid manual return of the unit to its initial position.

The rod 4a at its pivotal end carries a spring clip 31 (Fig. 10) secured in place by bolts 32 and engageable by an end of a sausage string, preliminary to coiling such string on the reel. Such clip has the nature of a short strip of spring metal acutely divergent to the rod 4a so that the casing of the initial sausage of a string may be wedged under such clip.

In use of the described machine, a sufficient portion of a long string of link sausage is advanced through the guide device to permit a terminal attachment of such string to the clip 31. The motor 23 is then started, and consequent rotation of the reel winds the sausage thereon as a flattened coil. The guide device advances at a rate serving to constantly deliver the string to the reel in a definite close proximity to the last-formed convolution on the reel, utilizing full capacity of the reel. When a coil of the desired size has been formed, the motor is stopped, preferably with the rod 4 uppermost as per Fig. 1. The operator now unlatches the mountings 12 and 12a and swings the corresponding ends of the two rods laterally, together with the completed coil of sausage. In being thus swung, the upper rod with the coil thereon is supported and manipulated by the operator, while the lower rod pivots on the pin 11. The top rod being now free at both ends thereof, it is moved sufficiently endwise to release the coil from the lower rod. Thus the top rod continues to support the coil during transfer of such rod from the reel to a rack (not shown) where the coils are accumulated. Preliminary to formation of another coil, a rod 4 duplicating that just removed is operatively engaged with the mountings 8 and 12, there being a supply of the rods 4 adequate to maintain operation of the machine.

The described machine can quite rapidly produce a coil of link sausage, in a highly compact form, and it is evident that such form may be maintained in transferring the coil to a rack. Thus there is effected a saving of time and labor and also of space on the rack. Owing to radial adjustability of the rods 4 and 4a, the machine may be readily suited to numerous different standard lengths of sausage links.

What I claim is:

A winding machine reel comprising a pair of end members, a pair of spaced journal members respectively carried by the respective end members and jointly establishing an axis of rotation for the reel, a pair of rods bridged between the end members at opposite sides of said axis, a pair of mountings on each end member for the corresponding ends of the rods, means on the end members for guiding the mountings in sliding travel to and from said axis, means for clamping the mountings rigidly to the end members in selective positions of said sliding travel, means for pivoting an end of one of said rods transversely thereof upon the corresponding mounting, means for releasing the pivotal rod at its other end from its mounting whereby such rod may be swung laterally about its pivotal end, and means on the mountings for the other rod for releasing such rod from its mountings.

References Cited in the file of this patent

UNITED STATES PATENTS

| | | |
|---|---|---|
| 740,328 | Steel | Sept. 29, 1903 |
| 906,725 | Leigh | Dec. 15, 1908 |
| 1,013,588 | Cowgill | Jan. 2, 1912 |
| 1,263,640 | Boylan | Apr. 23, 1918 |
| 1,317,108 | Skornia | Sept. 23, 1919 |
| 1,400,936 | Bull | Dec. 20, 1921 |
| 1,875,467 | Knoerzer et al. | Sept. 6, 1932 |
| 1,881,183 | Griffith | Oct. 4, 1932 |
| 2,613,039 | Holcomb | Oct. 7, 1952 |